United States Patent [19]

Senoo et al.

[11] 3,904,635
[45] Sept. 9, 1975

[54] METHOD FOR PREPARING N-ALKYL-α,β-UNSATURATED AMIDE

[75] Inventors: Saburo Senoo; Naoya Kominami; Yohei Fukuoka; Katsuyoshi Sasaki, all of Tokyo, Japan

[73] Assignee: Asahi Kasei Kogyo Kabushiki Kaisha, Osaka, Japan

[22] Filed: July 20, 1973

[21] Appl. No.: 381,200

Related U.S. Application Data

[63] Continuation of Ser. No. 4,777, Jan. 21, 1970, abandoned.

[30] Foreign Application Priority Data
Feb. 4, 1969  Japan.................................. 44-7826
Feb. 4, 1969  Japan.................................. 44-7827

[52] U.S. Cl... 260/293.86; 260/88.3 R; 260/89.7 R; 260/326.5 E; 260/465.9; 260/561 A; 260/561 N; 260/882; 260/883
[51] Int. Cl............................................ C07d 29/20
[58] Field of Search..... 260/293.86, 326.5 E, 561 N

[56] References Cited
UNITED STATES PATENTS
2,357,484    9/1944    Martin.............................. 260/239

*Primary Examiner*—John M. Ford
*Assistant Examiner*—S. D. Winters
*Attorney, Agent, or Firm*—Fred Philpitt

[57] ABSTRACT

A N-alkyl α,β-unsaturated amide is prepared by allowing one part by mole of an α,β-unsaturated nitrile represented by a general formula of

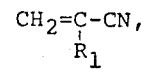

wherein $R_1$ represents a hydrogen atom or an alkyl group to react with 1–10 parts by mole of an alkylamine represented by the general formula,

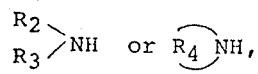

wherein $R_2$ represents a hydrogen atom or an alkyl group, $R_3$ an alkyl group, and $R_4$ an alkylene group having four to five carbon atoms, and 1–20 parts by mole of water at a temperature of 100° – 300°C in the presence or in the absence of a catalyst. The N-alkyl-α,β-unsaturated amide is used as a monomer for resins, modifiers for polymers and intermediate products for organic chemicals.

18 Claims, No Drawings

METHOD FOR PREPARING N-ALKYL-α,β-UNSATURATED AMIDE

This is a continuation of application Ser. No. 4,777, filed Jan. 21, 1970, and now abandoned.

This invention relates to a method for preparing N-alkyl-α,β-unsaturated amide by allowing α,β-unsaturated nitrile to react with alkylamine and water.

N-alkyl-α,β-unsaturated amide is expected to be used commercially as a monomer for resin, modifiers for polyacrylonitrile, an intermediate raw material for organic chemicals, or in other applications.

BACKGROUND OF THE INVENTION

Heretofore, a method for preparing N-alkyl-α,β-unsaturated amide, for example, from α,β-unsaturated amide or α,β-unsaturated carboxylic acid ester and alkylamine as raw materials has been known [J. G. Erickson: J. Am. Chem. Soc. 74 6281 (1952)]. However, α,β-unsaturated amide or α,β-unsaturated carboxylic acid ester is expensive, and thus the utilization of N-alkyl-α,β-unsaturated amide has been restricted. If α,β-unsaturated nitrile, which is readily available in commerce and very cheap, can be used in place of (α,β-unsaturated amide or α,β-unsaturated carboxylic acid ester), N-alkyl-α,β-unsaturated amide can be prepared at a low cost, and its commercial usefulness will be very high.

SUMMARY OF THE INVENTION

The present inventors have accomplished the present method as a result of strenous efforts and studies from said view-point. That is to say, the present method is to prepare N-alkyl-α,β-unsaturated amide directly by allowing α,β-unsaturated nitrile, to react with alkylamine and water, quite different from the conventional method.

The α,β-unsaturated nitrile used in the present invention is represented by the general formula of

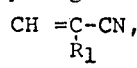

wherein $R_1$ represents a hydrogen atom or an alkyl group. For example, the α,β-unsaturated nitrile includes acrylonitrile, α-methylacrylonitrile, α-ethylacrylonitrile, α-n-propylacrylonitrile, α-isopropylacrylonitrile, α-nbutylacrylonitrile, α-sec.-butylacrylonitrile, α-n-amylacrylonitrile, α-n-hexylacrylonitrile, etc.

The alkylamine used in the present invention is represented by the general formula of

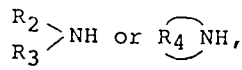

wherein $R_2$ is a hydrogen atom or an alkyl group, $R_3$ an alkyl group and $R_4$ an alkylene group having four or five carbon atoms, and includes, for example, methylamine, dimethylamine, ethylamine, diethylamine, n-propylamine, di-n-propylamine, n-butylamine, di-n-butylamine, isobutylamine, diisobutylamine, n-amylamine, di-n-amylamine, n-hexylamine, cyclohexylamine, pyrrolidine, piperidine, etc.

The present method can be carried out by using said compounds. For example, when very cheap acrylonitrile is used as the α,β-unsaturated nitrile and dimethylamine prepared from methanol and ammonia is used as the alkylamine, N,N-dimethylacrylamide can be very readily and very cheaply prepared. N,N-dimethylacrylamide is a very useful monomer, because the polymer obtained by polymerization of said monomer is a useful resin having a higher softening point of about 300°C. [K. Butler et al "Journal of Polymer Science" 48 P. 357–366 (1960)]. When N,N-dimethylacrylamide is used as a polyacrylonitrile modifier, it shows very great effects upon a hygroscopic property, antistatic propety and dyeability of the polyacrylonitrile, and yet no deterioration is brought about thereby in other useful properties. According to the present invention, such as a useful N,N-dimethylacrylamide can be very cheaply prepared, and thus the present invention has a great commercial usefulness.

According to the present invention, N-alkyl-α,β-unsaturated amide is prepared by reaction of α,β-unsaturated nitrile with alkylamine and water, but the mechanism of forming N-alkyl-α,β-unsaturated amide includes verious reactions and are very complicated. However, it can be presumed in view of the resulting products, that the main reactions are based on two stages. For example, in the reaction of acrylonitrile with dimethylamine in the presence of water, the following stages can be presumed:

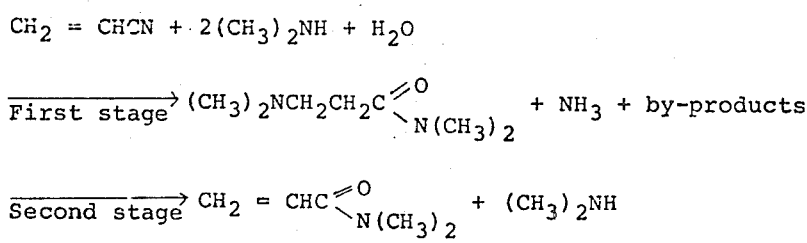

That is to say, acrylonitrile, dimethylamine and water are reacted with one another to form N,N-dimethyl-β-dimethylaminopropionamide and ammonia in the first stage, and the resulting N,N-dimethyl-β-dimethylaminopropionamide undergoes dedimethylamination reaction and regeneration of double bond is thereby brought about to form N,N-dimethylacrylamide in the second stage. The by-products, as referred to in the above reaction formula, include oligomers or polymers of β-dimethylaminopropionitrile, β-amino-N,N-dimethylpropionamide, β-dimethylamino-propionamide and β-alanine.

Said reactions are reversible, and it is presumed that the first stage reaction and the second reaction never take place separately, but are kept in an equilibrium in the reaction system. In the actual reaction system, it is also presumable that other reactions than those represented by the foregoing formulas, for example, a reaction which forms directly N,N-dimethylacrylamide without forming an intermediate product, N,N-dimethyl-β-dimethylpropionamide, or a reaction which passes through the by-products in the foregoing formula take place as a main reaction. However, it is presumable that at the completion of the reaction, the resulting products are in an equilibrium relation of all these reactions. Further, in order to shift the equilibrium and obtain the desired N,N-dimethylacrylamide in a high yield, the following measures can be taken into account.

In order to shift the reaction towards the right side in the foregoing reaction, it should be effective to remove ammonia from the reaction system in the first stage reaction and remove dimethylamine from the reaction system in the second stage reaction. The same way of thinking can be likewise taken if aforementioned other reactions which may liberate ammonia or dimethylamine also take place as a main reaction.

It has been found as a result of detailed studies on the best condition of the reactions, that the following three processes are available.

A. A process for preparing N-alkyl-$\alpha,\beta$-unsaturated amide by preparing N-alkyl-$\beta$-alkylaminoamide from $\alpha,\beta$-unsaturated nitrile, alkylamine and water, and removing alkylamine from the resulting compound of a high purity to regenerate the double bond.

B. A process for preparinng N-alkyl-$\alpha,\beta$-unsaturated amide by allowing $\alpha,\beta$-unsaturated nitrile to react with alkylamine and water, and adjusting the reaction conditions without separating the products to regenerate the double bond.

C. A process for preparing N-alkyl-$\alpha,\beta$-unsaturated amide by adjusting the amount of amine in the reaction of $\alpha,\beta$-unsaturated nitrile with alkylamine and water to make the first stage reaction proceed and at the same time the second stage reaction proceed.

In carrying out the present invention, the alkylamine is used in a molar amount equal to or more than that of the $\alpha,\beta$-unsaturated nitrile, but if the alkylamine is used in too excessive amount, the amount of amine to be recycled will be larger, and consequently the completion of the reaction will be retarded. Thus, too much excessive amount of alkylamine is not desirable. Accordingly, it is preferable to use alkylamine in a molar amount 1-10 times as much as that of $\alpha,\beta$-unsaturated nitrile.

Water is used in a molar amount equal to or more than that of the $\alpha,\beta$-unsaturated nitrile, but if the water is used too much, the completion of the reaction will be retarded, and the by-products will be increased. Thus, too much excessive amount of water is not desirable. Accordingly, it is preferable to use water in a molar amount 1-20 times as much as that of $\alpha,\beta$-unsaturated nitrile.

The $\alpha,\beta$-unsaturated nitrile, alkylamine and water can be all added to a reaction system at the start of the reaction individually, or can be added continuously or intermittently to the reaction system with the progress of the reaction. When a large amount of heat is released by adding alkylamine to $\alpha,\beta$-unsaturated nitrile, depending upon the kind of alkylamine, it is preferable to add alkylamine to the reaction system with cooling.

The reaction is carried out at a temperature of 100°C or higher, but if the reaction temperature is too high, the side reaction tends to take place and the yield of the desired N-alkyl $\alpha,\beta$-unsaturated amide decreases. Thus, too high a temperature is not desirable. Accordingly, it is preferable to carry out the reaction at a temperature ranging from 100°C to 300°C, but particularly preferable at a temperature ranging from 150°C to 280°C.

The reaction is carried out under the atmospheric or a superatmospheric pressure of lower than about 150 atm. When the reaction is carried out under the atmospheric pressure, sometimes it is necessary to inject alkylamine into the reaction system, and the reaction rate is not also high, so it is advantageous to carry out the reaction under a pressure. When the reaction is carried out particularly at a temperature above the atmospheric boiling point of N-alkyl-$\alpha,\beta$-unsaturated amide produced in the second stage reaction, it is effective to apply a pressure to the reaction system in such a degree as capable of suppressing the boining of the produced N-alkyl-$\alpha,\beta$-unsaturated amide and vaporize only unreacted alkylamine and the alkylamine formed by the deamination reaction to suppress the reverse reaction. In that case, it is effective to pass an inert gas such as nitrogen, helium, argon through the reaction system.

Operational features of each of said processes (A), (B) and (C) will now be explained below:

In the processes (A) and (B), the reaction well proceeds when the alkylamine is used in a molar amount at least twice as much as that of the $\alpha,\beta$-unsaturated nitrile, whereas in the process (C) it is preferable that the alkylamine is used in a molar amount 1-2 times as much as that of $\alpha,\beta$-unsaturated nitrile. In the processes (A) and (B) the first stage reaction and the second stage reaction are operationally distinguished from each other. In the first stage reaction, the reaction temperature and the reaction pressure must be selected so that the alkylamine may not be distilled off from the reaction system, but in the second stage reaction, the reaction temperature and the reaction pressure must be selected so that the alkylamine may be distilled off from the reaction system. Further, in order to suppress the polymerization of the product, it is desirable to minimize the mean heating time. So it is effective to set the reaction conditions in such way that the reaction mixture of the first stage may be successively added to the reaction system of the second stage and the reaction product of the second stage may be successively distilled off. Particularly in the process (A), it is effective for suppressing the polymerization of the product, N-alkyl-$\alpha,\beta$-unsaturated amide, to keep the conversion of N-alkyl-$\beta$-alkylaminoamide at 80% or less in the second stage reaction. However, in the process (C), the first stage reaction and the second stage reaction are not distinguished from each other, and take place at the same time in the same reaction system. That is, the alkylamine formed by the deamination reaction is used to form alkylamide again. Accordingly, in the process (C), the deamination reaction does not take place with ease when the alkylamine is used in excess of the necessary amount, and consequently the progress of the reaction is thereby interrupted.

As to the reaction by-products in the process (A), N-alkyl-$\beta$-alkylaminoamide can be obtained in high yield by recycling the by-products obtained when N-alkyl-$\beta$-alkylaminoamide is once separated from the reaction system. Further, in the processes (B) and (C), any operation of separating intermediate products from the reaction system is not involved, but there are such by-products that can be converted to the N-alkyl-$\alpha,\beta$-unsaturated amide in the successive reactions, and thus the intermediate products can be utilized without any separation. In the processes (B) and (C), it is effective to recycle the by-products obtained at the final separation of N-alkyl-unsaturated amide, to the feed system.

Among these three processes, the process (C) is most preferable, because its operation is very simple and the amount of alkylamine is smaller.

Furthermore, it is effective to add well-known radical polymerization inhibitor to the reaction system. Effective well-known radical polymerization inhibitors include, for example, hydroquinone, p-methoxyphenol, resorcinol, catechol, pyrogallol, 2,7-dihydroxynaphthalene, t-butyl-catechol, p-phenylenediamine, β-naphthylamine, 1,1-diphenylpicrylhydrazol, picric acid, acetonethiocarbazone, cuprous chloride, cupric acetate, sulfur, etc.

As N-alkyl-α,β-unsaturated amide can be prepared directly by the reaction of α,β-unsaturated nitrile with alkylamine and water without using a catalyst in the present invention, the present invention is very valuable in this sense, but the use of a catalyst has such advantages that the reaction rate of α,β-unsaturated nitrile with alkylamine and water is accelerated; consequently the reaction can be rapidly completed; and the side reaction can be suppressed, whereby the yield can be increased.

The catalyst used in the present invention can be selected from the following two groups:

1. Simple metal substances such as copper, zinc, tin, iron, cobalt, and nickel.
2. Oxides, peroxide, hydroxides, inorganic acid salts and organic acid salts of such metals as copper, zinc, tin, iron, cobalt, nickel, cadmium, silver, mercury, titanium, zirconium, lead, vanadium, antimony, bismuth, chromium, molybdenum, tungsten, manganese, ruthenium, rhodium, osmium, palladium, iridium, gold, and platinum.

More particularly, the effective inorganic acid salts and organic acid salts of the group (2) include carbonates, cyanates, nitrates, sulfates, halogenates, oxyhalogenates, sulfides, phosphates, pyrophosphates, borates, nitrites, rhodanates, chromates, bichromates, molybdenates, phospho-molybdenates, tungstenates, permanganates, formates, acetates, peracetates, propionates, butyrates, stearates, oxalates, citrates, p-toluenesulfonates, picrates, naphthenates, benzoates, tolylates, etc.

Among these catalysts, halogenates of such metals as copper, zinc, cadmium, iron, tin, chromium, manganese, antimony, bismuth, rhodium, osmium, titanium, cobalt, nickel and palladium, and organic acid salts of such metals as cadmium, zinc, copper, cobalt, tin and iron are most effective.

These catalysts are used in a dissolved state or a suspended state in the reaction liquor. These catalysts are added to the reaction system at the same time when α,β-unsaturated nitrile is allowed to react with alkylamine and water. The catalyst can be added all at once from the beginning or continuously or intermittently to the reaction system with the progress of the reaction.

0.001 to 20% by mole of the catalyst is added to the reaction system on the basis of the raw material, α,β-unsaturated nitrile, but if the amount of the catalyst is too small, the catalytic effect is lowered, whereas addition of too much catalyst is not desirable in commercial view point, because separation and purification of the product will be difficult. Thus, it is most preferable to add 0.01 to 10% by mole of the catalyst to the reaction system on the basis of α,β-unsaturated nitrile.

The present invention will now be explained in detail, referring to Examples:

EXAMPLE 1

This example is in accordance with the process (C). 65 g of dimethylamine and 20 g of water were added with stirring at a temperature of 40°C or less to 53.0 g of acrylonitrile slowly, and 6.5 g of zinc chloride was added to the solution. The thus obtained solution was charged into a 300-ml autoclave of induction-rotating stirring system, and after the nitrogen flush, the solution was heated to 200°C with stirring for 2 hours. By subjecting the thus obtained reaction liquor to a reduced-pressure distillation according to the conventional method, 41.5 g of N,N-dimethylacrylamide (purity: 95%; yield based on acrylonitrile: 39.8%) was obtained.

The thus obtained N,N-dimethylacrylamide had a boiling point of 47°–48°C/3 mm Hg and showed infrared ray absorption spectra of α,β-unsaturated amide groups at ν max. 1,650 cm$^{-1}$ and 1,610 cm$^{-1}$. The following elemental analysis values are given:

Calc.:   C:60.58,   H:9.15,   N:14.13   as $C_6H_9ON$
Found:   C:60.25,   H:9.01,   N:14.41

EXAMPLE 2

This example is in accordance with the process (B). 110 g of dimethylamine and 20 g of water were added with stirring at a temperature of 40°C or less to 53 g of acrylonitrile slowly, and 5.1 g of stannic chloride was added to the solution. Then, the resulting solution was charged into a 300-ml autoclave of induction-rotating stirring system, and after the nitrogen flush, the solution was heated to 180°C for 4 hours with stirring. The solution was then cooled to room temperature and the seal was opened. The thus obtained product and 0.5 g of hydroquinone were placed into a 200-ml, three-necked flask provided with a column packed with 5 cc of stainless steel Dickson packings, and slowly heated while passing nitrogen gas into the flask. After the by-produced ammonia and unreacted dimethylamine had been distilled off from the column, the temperature of the column inside became to rise. Heating was continued while keeping the column inside temperature at 160°–180°C, and 65.1 g of distillate was obtained. By redistilling the thus obtained distillate under a reduced pressure, 51.5 g of N,N-dimethylacrylamide was obtained (yield: 52.0%).

EXAMPLE 3

This example is in accordance with the process (B). 67.0 g of α-methylacrylonitrile, 100 g of dimethylamine, 20 g of water, 6 g of zinc chloride and 0.5 g of hydroquinone as a polymerization inhibitor were charged into a 300-ml autoclave of induction-rotating stirring system, and reaction was carried out at 220°C for 2 hours.

The solution was cooled to room temperature and then seal was opened. After the by-produced ammonia had been removed from the reaction system, 45 g of dimethylamine was added to the reaction system, and the reaction was again carried out at 200°C for 2 hours. The thus obtained reaction liquor was placed into a 200-ml, three-necked flask provided with a column packed with 5 cc of stainless steel Dickson packings, and slowly heated while passing nitrogen gas into the flask. After the by-produced ammonia and the unreacted dimethylamine distilled off from the column, the temperature of the column inside became to rise. Heating was continued while keeping the temperature of the column inside at 170°–190°C, whereby 89.6 g of the distillate was obtained.

By redistilling the distillate under a reduced pressure, 71.3 g of N,N-dimethyl-α-methylacrylamide was obtained (yield: 63.1%). The thus obtained N,N-dimethyl-α-methylacrylamide had a boiling point of 51°–52°C/3 mm Hg and showed infra-red absorption spectra of α,β-unsaturated amide at ν max. 1,650 cm$^{-1}$ and 1,610 cm$^{-1}$.

EXAMPLE 4

This example is in accordance with the process (B).

135 g of dimethylamine and 20 g of water were slowly added to 53 g of acrylonitrile, while keeping the temperature at 50°C or less, and 5.2 g of cupric chloride was added to the solution. The resulting solution was charged into a 300-ml autoclave of induction-rotating stirring system provided with a condenser kept at 60°C. The autoclave was kept at a pressure of 40 kg/cm$^2$, and nitrogen gas was allowed to pass through the autoclave at a rate of 100 ml/minute. The solution was heated to 200°C for 3 hours with stirring. As a result, 14.1 g of ammonia (83% on the basis of acrylonitrile) was continuously distilled off through said condenser tube. At the same time, 6.8 g of dimethylamine was also distilled off. Further, after 1.5 g of phenylenediamine was added to the reaction system as a polymerization inhibitor, the reaction temperature was elevated to 240°C, and by slowly lowering the autoclave inside pressure to 3.5 kg/cm$^2$, dimethylamine was started to distill off. After the pressure had been lowered to 3.5 kg/cm$^2$, the rate of nitrogen gas stream was increased to 50 ml/minute, and the reaction was continued. As a result, distilling-off of dimethylamine was stopped after about 1 hour, and the reaction was completed. By treating the thus obtained product in the same manner as in Example 1, 71.2 g of N,N-dimethylacrylamide was obtained (yield: 72.1% based on acrylonitrile).

EXAMPLE 5

This example is in accordance with the process (B).

110 g of dimethyl amine and 20 g of water were added to 53 g of acrylonitrile in the same manner as in Example 2, and then 5.1 g of stannic chloride was added thereto. The resulting solution was charged into a 300-ml autoclave of induction-rotating stirring system, and after the nitrogen flush, the solution was heated at 190°C for 4 hours with stirring. After the solution had been cooled to room temperature, 68.2 of distillate was obtained by carrying out treatment in the same manner as in Example 2. At the same time, 28.1 g of residue remaining in the flask was obtained. By redistilling said distillate under a reduced pressure, 53.2 g of N,N-dimethylacrylamide was obtained (yield: 53.8%). At that time, 4.2 g of β-dimethylaminopropionitrile was obtained as a by-product. 4.2 g of the thus obtained β-dimethylaminopropionitrile and 28.1 g of the residue remaining in the flask were added to 53 g of acrylonitrile, 110 g of dimethylamine, 20 g of water and 5.1 g of stannic chloride, and reaction was carried out in the same manner as above, whereby 59.6 g of N,N-dimethylacrylamide was obtained (yield: 60.2%).

EXAMPLE 6

This example is in accordance with the process A.

135 g of dimethylamine, 20 g of water and 4.5 g of cadmium chloride were added to 53 g of acrylonitrile in the same manner as in Example 4, and reaction was carried out at 200°C for 3 hours in the same manner as in Example 4. By distilling the thus obtained product under a reduced pressure, 124.0 g of N,N-dimethyl-β-dimethylaminopropionamide was obtained (yield: 86.1% on the basis of acrylonitrile). During said distillation, 3.5 g of a fraction having a boiling point of 55°–98°C/10 mm Hg and 8.6 g of the bottoms were obtained as by-products. Acrylonitrile and other substances were added to 3.5 g of the thus obtained fraction and 8.6 g of the bottoms in the same manner as above, and reaction and after treatment were carried out in quite same manner as above, whereby 132.5 g of N,N-dimethyl-β-dimethylaminopropionamide was obtained (yield: 92.1% on the basis of acrylonitrile). 220 g of the thus obtained N,N-dimethyl-β-dimethylaminopropionamide was poured at a rate of 10 ml/minute into a stainless steel reaction column having an inner diameter of 20 mm and a height of 1 m, packed with Dickson packings having sizes of 3 mm ϕ and heated to 250°C, from the upper part thereof. At the same time, nitrogen gas preheated to 250°C was injected at a rate of 300 ml/minute into the column from the lower part thereof. Said stainless steel reaction column was provided with coolers at the upper part and the lower part respectively, and the column inside was kept at a pressure of 4 kg/cm$^2$. The reaction liquor running out from the lower part of the reaction column was collected and subjected to a reduced pressure distillation according to the conventional method, whereby 104.6 g of N,N-dimethylacrylamide was obtained (yield: 76.0% on the basis of N,N-dimethyl-β-dimethylaminopropionamide), and at the same time 29.4 g of unreacted N,N-dimethyl-β-dimethylpropionamide was recovered.

EXAMPLE 7

This example is in accordance with the process (B),

To 3.2 g of acrylonitrile, 8.1 g of dimethylamine and 1.1 g of water were added 5% by mole of the catalyst as shown in Table on the basis of acrylonitrile, and the solution was charged into a 20-ml stainless steel microcylinder. The cylinder was immersed into an oil bath at a constant temperature and reaction was carried out at 220°C for 2 hours with shaking. After the completion of the reaction, the cylinder was cooled to room temperature and the seal was opened. Then, 0.1 g of hydroquinone was added thereto, and a cooling tube and a nitrogen gas feed tube were attached to the cylinder, and reflux was carried out while heating the cylinder at 200°C for 3 hours. The thus obtained products were quantitatively determined by gas chromatography.

The analysis conditions are given below:
kind of apparatus: Shimazi GC-2C type,
column: glass column, 3 m
packings: amine 220, 10% by weight, Diasolid A
thermostat temperature: 170°C (300°C)
carrier gas: He 600 cc/minute
inside standard substance: N-ethylpropionamide
analysis method: clipping area method Table 1 shows the catalyst added and the yield of the thus obtained product N,N-dimethylacrylamide on the basis of acrylonitrile.

Table 1

| Run No. | Catalyst | Yield |
|---|---|---|
| 1 | — | 5.2 |
| 2 | Zinc acetate | 52.6 |
| 3 | Zinc chlorate | 45.0 |
| 4 | Silver nitrate | 35.7 |
| 5 | Cadmium acetate | 51.6 |
| 6 | Cadmium phosphate | 48.6 |
| 7 | Mercurous chloride | 31.1 |
| 8 | Mercuric chloride | 32.7 |
| 9 | Stannous chloride | 65.2 |
| 10 | Stannic chloride | 62.8 |
| 11 | Potassium permanganate | 43.3 |
| 12 | Manganese dichloride | 38.9 |
| 13 | Manganese trichloride | 40.5 |
| 14 | Manganese tetrachloride | 51.8 |
| 15 | Vanadium chloride | 36.4 |
| 16 | Antimony trichloride | 51.5 |
| 17 | Manganese sulfide | 45.1 |
| 18 | Lead peracetate | 18.0 |
| 19 | Lead peroxide | 18.7 |
| 20 | Lead chlorate | 19.0 |
| 21 | Zirconium oxychloride | 35.7 |
| 22 | Zinc phosphite | 45.2 |
| 23 | Copper (powdered) | 21.8 |
| 24 | Zinc (powdered) | 18.3 |
| 25 | Tin (powdered) | 18.5 |
| 26 | Iron (powdered) | 19.0 |
| 27 | Raney cobalt (powdered) | 17.5 |
| 28 | Raney nickel (powdered) | 17.0 |
| 29 | Molybdenic acid | 21.9 |
| 30 | Tungstenic acid | 28.4 |
| 31 | Cobalt carbonate (basic) | 35.6 |
| 32 | Zinc stearate | 55.1 |
| 33 | Cuprous cyanate | 51.7 |
| 34 | Chloroauric acid | 29.2 |
| 35 | Mercury thiocyanate | 35.8 |
| 36 | Stannous oxalate | 49.3 |
| 37 | p-toluenesulfonic acid | 25.9 |
| 38 | Antimony tribromide | 48.4 |
| 39 | Bismuth oxychloride | 47.6 |
| 40 | Chromium sulfate | 35.1 |
| 41 | Chromous chloride | 48.0 |
| 42 | Iridium chloride | 29.2 |
| 43 | Ammonium permanganate | 35.7 |
| 44 | Cobalt naphthenate | 62.8 |
| 45 | Nickel bromide | 49.3 |
| 46 | Ruthenium chloride | 41.9 |
| 47 | Rhodium chloride | 49.3 |
| 48 | Palladium chloride | 51.9 |
| 49 | Ferrous chloride | 49.0 |
| 50 | Ferric bromide | 52.1 |
| 51 | Mercuric sulfate | 24.4 |
| 52 | Cuprous bromide | 55.6 |
| 53 | Cupric iodide | 48.1 |
| 54 | Zinc sulfide | 35.7 |
| 55 | Ferric formate | 59.2 |
| 56 | Cupric n-butyrate | 45.8 |
| 57 | Osmium tetrachloride | 52.3 |
| 58 | Platinum chloride | 31.9 |
| 59 | Titanium trichloride | 59.4 |
| 60 | Zinc hydroxide | 25.6 |
| 61 | zinc thiocyanate | 46.1 |
| 62 | Zinc phosphite | 42.7 |
| 63 | Zinc borate | 44.2 |
| 64 | Zinc nitrite | 51.8 |
| 65 | Chromic acid | 35.3 |
| 66 | Phosphomolybdenic acid | 46.9 |
| 67 | Zinc benzoate | 47.4 |
| 68 | Zinc tolylate | 41.6 |
| 69 | Zinc propionate | 58.1 |
| 70 | Zinc citrate | 51.2 |
| 71 | Zinc chloride, zinc acetate, osmium tetrachloride, lead oxide and zinc (powdered), each 1% by mole | 50.5 |

EXAMPLE 8

This example is in accordance with the process (A). 110 g of diethylamine and 20 g of water were added at a temperature of 40°C or less with stirring to 53 g of acrylonitrile slowly, and 6.2 g of cobalt chloride was added to the solution. The resulting solution was charged into a 300-ml autoclave of induction-rotating stirring system and after the nitrogen flush, the solution was heated at 180°C for 2 hours with stirring. After the solution had been cooled to room temperature, the seal was opened. After the by-produced ammonia was removed from the reaction system, the distillation was carried out under a reduced pressure. After a small amount of low boiling substances had been distilled off, 16.2 g of a mixture of β-dimethylaminopropionitrile and N,N-dimethylacrylamide was distilled off. By further continuing the distillation, 95.8 g of N,N-dimethyl-β-dimethylaminopropionamide was obtained (yield: 65.5%). 95.8 g of the thus obtained N,N-dimethyl-β-dimethylaminopropionamide was placed in a 200-ml, three-necked flask, and 48.5 g of N,N-dimethylacrylamide was obtained by conducting the same treatment as in Example 1 (yield: 49.0%).

EXAMPLE 9

This example is in accordance with the process (B).
10.1 g of stannic chloride was added to 32 g of acrylonitrile, 280 g of di-n-hexylamine and 11 g of water, and the resulting solution was charged into a 500 ml autoclave of induction-rotating stirring system. After the nitrogen flush, reaction was carried out at 200°C for 1 hour. After the solution had been cooled to room temperature, the seal was opened. After the by-produced ammonia had been removed from the reaction system, 90 g of di-n-hexylamine was added to the reaction system, and the reaction was carried out again at 200°C for 1 hour. By distilling the thus obtained reaction liquor under the atmosphere pressure, the by-produced ammonia and 220 g of excessive di-n-hexylamine were distilled off, and then, the reaction liquor was placed in a 200-ml, three-necked flask provided with a column packed with 5 cc of stainless steel Dickson packings in the same manner as in Example 2, and slowly heated while keeping the flask under a reduced pressure (20 mm Hg). After di-n-hexylamine had been distilled off, the column inside temperature became to raise. Heating was carried out at a column inside temperature of 150°–170°C, whereby 98.5 g of distillate was obtained.

By redistilling the thus obtained distillate under a reduced pressure, 85.4 g of N,N-di-n-hexyl acrylamide was obtained (yield: 68.3%). The thus obtained N,N-di-n-hexylacrylamide had a boiling point of 132°–135°C/1 mm Hg and showed infra-red absorption spectra of α,β-unsaturated amide at ν max. 1,650 $cm^{-1}$ and 1,610 $cm^{-1}$.

EXAMPLE 10

By carrying out reaction in quite same manner as in Example 4, using 165 g of iso-butylamine in place of dimethylamine and successively carrying out after-treatment, 75.6 g of N-isobutylacrylamide was obtained (yield: 59.5% on the basis of acrylonitrile). The thus obtained N-isobutylacrylamide had a boiling point of 103°–105°C/1 mm Hg and showed infra-red absorption spectra of α,β-unsaturated amide at ν max. 1,650 $cm^{-1}$ and 1,610 $cm^{-1}$.

EXAMPLE 11

This example is in accordance with the process (B). By carrying out reaction in quite same manner as in Example 4, using 165 g of piperidine in place of dimethylamine, and sucessively carrying out after-treatment, 91.0 g of acryloylpiperidine was obtained (yield: 71.7% on the basis of acrylonitrile). The thus obtained acryloylpiperidine had a boiling point of 92°–95°C/15 mm Hg and showed infra-red absorption spectra of α,β-unsaturated amide at ν max. 1,650 cm$^{-1}$ and 1,610 cm$^{-1}$.

EXAMPLE 12

150 g of diethylamine and 20 g of water were added at a temperature of 40°C or less with stirring to 53.0 g of acrylonitrile slowly, and then 6.5 g of Zinc chloride was added to the solution. The resulting solution was charged into a 300-ml autoclave of induction-rotating stirring system, and after the nitrogen flush, the solution was heated at 100°C for 48 hours with stirring. After the solution had been cooled to room temperature, the seal was opened, the thus obtained product and 0.5 g of hydroquinone were placed into a 200-ml, three-necked flask provided with a column packed with 5 cc of stainless steel, Dickson packings, and heated slowly while passing nitrogen gas into the flask. After the by-produced ammonia and unreacted diethylamine had been distilled off from the column, a liquid started to be distilled off, when the column inside temperature reached 180°C. Heating was conducted, while keeping the temperature of the column inside at 180°–210°C, whereby 40.5 g of the distillate was obtained. By redistilling the distillate under a reduced pressure, 38.5 g of N,N-diethylacrylamide having a boiling point of 95°–99°C/18 mm Hg was obtained (yield: 30.0%). Its infra-red absorption spectra showed absorptions of α,β-unsaturated amide groups at ν max. 1,650 cm$^{-1}$ and 1,610 cm$^{-1}$. Its elemental analysis values are as follows:

```
Calc.:  C:66.14,  H:1.02  and  N:11.02   as C₇H₁₃ON
Found:  C:66.32,  H:1.20  and  N:11.00
```

EXAMPLE 13

232 g of di-n-butylamine and 11 g of water were added at a temperature of 40°C or less with stirring to 32 g of acrylonitrile slowly, and then 1.5 g of stannic chloride, 5.0 g of zinc chloride, 3.5 g of ferric chloride and 1.0 g of cupric chloride were added to the solution. The resulting solution was charged into a 500-ml, three-necked flask provided with a cooling tube, and after the nitrogen flush, reaction was conducted at 100°C for 48 hours with stirring. At that time, only the by-produced ammonia was discharged from the cooling tube to the outside of the reaction system.

0.5 g of phenylenediamine was added to the resulting reaction liquor, and heating was slowly carried out while keeping the inside pressure at a reduced state (20 mm Hg). After the excessive di-n-butylamine had been distilled off, heating was further conducted at 100°C for 20 hours. Then, by distilling the reaction liquor under a reduced pressure (1 mm Hg), 30 g of a fraction of 90°–100°C was obtained. By redistilling the fraction, 28 g of N,N-di-n-butylacrylamide having a boiling point of 95°–99°C/1 mm Hg was obtained (yield: 25%). Its infra-red absorption spectra showed absorptions of α,β-unsaturated amide at ν max. 1,650 cm$^{-1}$ and 1,610 cm$^{-1}$.

We claim:

1. A method for preparing an N-alkyl-α,β-unsaturated amide, which comprises reacting at a temperature ranging from 100° to 300° C, and under superatmospheric pressure, α,β-unsaturated nitrile represented by the formula,

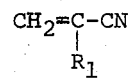

wherein R$_1$ represents a hydrogen atom or an alkyl group of one to six carbon atoms with an alkylamine represented by the formula,

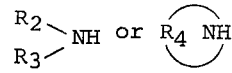

wherein R$_2$ represents a hydrogen atom or an alkyl group of one to six carbon atoms, R$_3$ an alkyl group of one to six carbon atoms, and R$_4$ an alkylene group having four to five carbon atoms, and water, wherein the alkylamine is used in a molar amount of 1–10 times as much as that of the α,β-unsaturated nitrile, and wherein the α,β-unsaturated nitrile, alkylamine and water are heated while maintaining the liquid phase and then the alkylamine is removed from the reaction system while heating the thus obtained reaction liquor or N-alkyl-β-alkylaminoamide is removed from the thus obtained reaction liquor.

2. The method of claim 1 wherein the alkylamine is used in a molar amount of at least twice as much as that of the α,β-unsaturated nitrile.

3. A method according to claim 1 wherein the water is used in a molar amount 1–20 times as much as that of the α,β-unsaturated nitrile.

4. A method according to claim 1 wherein the by-product obtained is recycled.

5. A method according to claim 1 wherein the alkylamine is removed from the reaction system with heating while passing an inert gas through the reaction system.

6. A method according to claim 1 wherein the alkylamine is removed from the reaction system under a superatmospheric pressure with heating to a temperature above the boiling point under the atmosphere of the formed N-alkyl-α,β-unsaturated amide.

7. A method according to claim 1 wherein at least one member selected from the group consisting of metallic copper, zinc, tin, iron, cobalt, nickel, the oxides, the peroxides, the hydroxides, the inorganic acid salts and the organic acid salts of copper, zinc, tin, iron, cobalt, nickel, cadmium, silver, mercury, titanium, zirconium, lead, vanadium, antimony, bismuth, chromium, molybdenum, tungsten, manganese, ruthenium, rhodium, osmium, palladium, iridium, gold and platinum, is used as a catalyst.

8. A method according to claim 7 wherein 0.001 to 20% by mole of the catalyst is used on the basis of the α,β-unsaturated nitrile.

9. The method of claim 1 wherein said α,β-unsaturated nitrile is selected from the group of acrylonitrile, α-methylacrylonitrile, α-ethylacrylonitrile, α-n-propylacrylonitrile, α-isopropylacrylonitrile, α-n-butylacrylonitrile, α-sec.-butylacrylonitrile, α-n-amylacrylonitrile, and α-n-hexylacrylonitrile.

10. The method of claim 9 wherein said alkylamine is selected from the group of methylamine, dimethylamine, ethylamine, diethylamine, n-propylamine, di-n-propylamine, n-butylamine, di-n-butylamine, isobutylamine, diisobutylamine, n-amylamine, di-n-amylamine, n-hexylamine, cyclohexylamine, pyrrolidine, and piperidine.

11. The method of claim 1 wherein said alkylamine is selected from the group of methylamine, dimethylamine, ethylamine, diethylamine, n-propylamine, di-n-propylamine, n-butylamine, di-n-butylamine, isobutylamine, diisobutylamine, n-amylamine, di-n-amylamine, n-hexylamine, cyclohexylamine, pyrrolidine, and piperidine.

12. The method of claim 7 wherein the inorganic acid salts are selected from the group of carbonates, cyanates, nitrates, sulfates, halides, oxyhalides, sulfides, phosphates, pyrophosphates, borates, nitrites, rhodanates, chromates, bichromates molybdenates, phosphomolybdenates, tungstenates, and permanganates, and wherein the organic acid salts are selected from the group of formates, acetates, peracetates, propionates, butyrates, stearates, oxalates, citrates, p-toluenesulfonates, picrates, naphthenates, benzoates, and tolylates.

13. The method of claim 7 wherein said catalyst is selected from the group of zinc acetate, zinc chlorate, silver nitrate, cadmium acetate, cadmium phosphate, mercurous chloride, mercuric chloride, stannous chloride, stannic chloride, potassium permanganate, manganese dichloride, manganese trichloride, manganese tetrachloride, vanadium chloride, antimony trichloride, manganese sulfide, lead peracetate, lead peroxide, lead chlorate, zirconium oxychloride, zinc phosphite, zinc (powdered), tin (powdered), iron (powdered), raney cobalt (powdered), raney nickel (powdered), molybdenic acid, tungstenic acid, cobalt carbonate (basic), zinc stearate, cuprous cyanate, chloroauric acid, mercury thiocyanate, stannous oxalate, p-toluenesulfonic acid, antimony tribromide, bismuth oxychloride, chromium sulfate, chromous chloride, iridium chloride, ammonium permanganate, cobalt naphthenate, nickel bromide, ruthenium chloride, rhodium chloride, palladium chloride, ferrous chloride, ferric bromide, mercuric sulfate, cuprous bromide, cupric iodide, zinc sulfide, ferric formate, cupric n-butyrate, osmium tetrachloride, platinum chloride, titanium trichloride, zinc hydroxide, zinc thiocyanate, zinc phosphite, zinc borate, zinc nitrite, chromic acid, zinc benzoate, zinc tolylate, zinc propionate, zinc citrate, zinc chloride, cupric chloride, cadmium chloride, and cobalt chloride.

14. The method of claim 7 wherein said catalyst is a mixture of zinc chloride, zinc acetate, osmium tetrachloride, lead oxide and zinc (powdered).

15. The method of claim 7 wherein the said catalyst is selected from the group of powdered copper and phosphomolybdenic acid.

16. The method of claim 7 wherein the oxides, the peroxides, and the hydroxides are selected from the group of lead oxide, lead peroxide, and zinc hydroxide.

17. The method of claim 1 wherein the reaction is carried out at a temperature ranging from 150° C to 280° C.

18. A method for preparing an N-alkyl-$\alpha,\beta$-unsaturated amide, which comprises reacting at a temperature ranging from 100° to 300° C and under superatmospheric pressure, and maintaining the liquid phase $\alpha,\beta$-unsaturated nitrile represented by the formula,

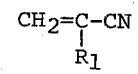

wherein $R_1$ represents a hydrogen atom or an alkyl group of one to six carbon atoms with an alkylamine represented by the general formula,

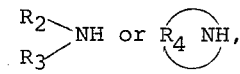

wherein $R_2$ represents a hydrogen atom or an alkyl group of one to six carbon atoms, $R_3$ an alkyl group of one to six carbon atoms, and $R_4$ an alkylene group having four to five carbon atoms, and water, wherein the alkylamine is used in a molar amount of 1–10 times as much as that of the $\alpha,\beta$-unsaturated nitrile.

* * * * *